Patented Dec. 13, 1949

2,490,973

UNITED STATES PATENT OFFICE 2,490,973

DEHYDROHALOGENATION

John E. Leonard, Perry Township, Franklin County, and Arthur E. Bearse, Grandview, Ohio, assignors, by mesne assignments, to Standard Oil Company, Chicago, Ill., a corporation of Indiana No Drawing. Application October 10, 1946, Serial No. 702,366

22 Claims. (Cl. 260—666)

This invention relates to a process and catalysts for dehydrohalogenation of organic halogen compounds containing at least two adjacent aliphatic carbon atoms bound, respectively, to a hydrogen atom and a halogen atom. More specifically, this invention relates to a method of preparing olefins and cyclo-olefins by dehydrohalogenation of haloalkanes and halocycloalkanes, particularly monohalo-compounds.

Previously described methods for converting alkyl chlorides into olefins have generally involved dehydrochlorination in the vapor phase at temperatures in the range of 200–500° C. (see Ellis, Chemistry of Petroleum Derivatives (1934), pp. 801–803) either with or without catalysts. Alternatively, olefins have been produced from alkyl chlorides by heating with alkaline materials such as quinoline or aqueous or alcoholic sodium hydroxide. The vapor phase reactions are frequently unsatisfactory because of the side-reactions which occur at the high temperatures which are required. Dehydrochlorinations employing alkaline materials which cannot be regenerated are objectionable because they require a stoichiometric quantity of the material to drive the reaction to completion.

It is an object of this invention to provide a process for dehydrohalogenation of organic halogen compounds by catalytic treatment in the liquid phase, said halogen compounds containing at least two adjacent aliphatic carbon atoms bound, respectively, to a hydrogen atom and a halogen atom. Another object is to provide novel dehydrohalogenation catalysts. An additional object is to provide a novel process and catalysts for dehydrohalogenation of organic compounds containing one halogen atom. A further object is to provide a novel process and catalysts for the synthesis of mono-olefin hydrocarbons. Still another object is to provide a method for the isolation of mono-olefins from a close boiling fraction containing paraffins, which method involves conversion of at least a portion of the olefins in said fraction to hydrohalides by treatment with a concentrated halogen acid or hydrogen halide, separation of olefin hydrohalides from said fraction, usually by fractional distillation, and dehydrohalogenation of the olefin hydrohalide to produce olefins. These and other objects will become apparent from the ensuing description of our invention.

We have discovered a simple and economical method of producing olefins catalytically from haloalkanes and halocycloalkanes in the liquid phase. We have observed that olefins can be prepared in substantially quantitative yields by heating monochloroalkanes or monochlorocycloalkanes in the liquid phase in the presence of a catalytic quantity of carboxylates of heavy metals having atomic numbers between 25 and 30, inclusive. By the term "carboxylate of a metal" we intend to denote a metal salt of organic acids of the carboxylic type.

It has previously been proposed to use inorganic salts of various heavy metals to carry out the dehydrohalogenation of various organic halogen compounds in the liquid phase. However, we have found that the employment of certain organic salts of various heavy metals results in much more rapid dehydrohalogenation than can be obtained with the catalysts of the prior art, notably inorganic salts of heavy metals. Moreover, various inorganic salts of heavy metals such as ferric chloride, zinc chloride and the like are Friedel-Crafts catalysts and rapidly polymerize a substantial proportion of the olefins which are formed upon dehydrohalogenation to yield a variety of polymers and tars which, in addition to reducing the effectiveness of the catalyst for further dehydrohalogenation, consumes the desired olefin product.

The dehydrohalogenation catalysts employed in accordance with our invention are carboxylates of manganese, iron, cobalt, nickel, copper and zinc, or their mixtures. Examples of suitable salts are the formates, acetates, propionates, butyrates, hexoates, laurates, oleates, benzoates, phthalates, naphthenates, succinates, etc. of the above-named metals, and the like. There is no reason to believe that the catalytic action of the carboxylates of the present invention depends simply upon their conversion in the course of the dehydrohalogenation process to the corresponding metal halides; if that were so, the corresponding metal halides should induce more rapid dehydrohalogenation than the metal carboxylates, and they do not. However, very small proportions of metal halides may operate as promoters or co-catalysts with the carboxylates of this invention. We have observed that there is more or less of an induction period during which no discernible dehydrohalogenation occurs in the process of the present invention and that this induction period can be averted or appreciably shortened by passing a small amount of a hydrohalogen acid, for example, hydrogen chloride gas, into the reaction mixture. Alternatively, a small amount of hydrohalogen acid employed in the synthesis of the organic halide charging stock can be allowed to remain therein.

Preferable catalysts for use in our dehydrohalogenation process are nickel, manganese, cobalt and ferrous acetates. Combinations of metal carboxylates are in some instances more effective dehydrohalogenation catalysts than the individual salts. Thus, a mixture of lead and manganous acetates was found to be a more effective dehydrohalogenation catalyst than either lead acetate or manganous acetate.

The amount of dehydrohalogenation catalyst employed in our process may vary from about 0.1 to about 10 percent by weight, or even more, depending upon the organic halogen compound to be treated. Ordinarily it is desirable to use between about 1 and about 3 per cent by weight of catalyst based on the weight of charging stock.

Our invention may be applied to the dehydrohalogenation of a wide variety of organic halogen compounds containing at least two adjacent aliphatic carbon atoms linked, respectively, to a hydrogen atom and a halogen atom. We have found our catalytic dehydrohalogenation process to be particularly effective in dehydrohalogenation of monohaloalkanes and monohalocycloalkanes. Our invention is particularly applicable to the dehydrohalogenation of organic halogen compounds containing the middle halogens. Bromo-compounds are somewhat more difficult to dehydrohalogenate than the corresponding chloro-compounds. Vicinal dihalides appear to be more resistant to dehydrohalogenation than monohalo-compounds.

Examples of suitable chlorides which may be dehydrochlorinated by the present process are cyclopentyl, methylcyclopentyl, cyclohexyl, alkylcyclohexyl, isopropyl, butyl, amyl, hexyl, heptyl, octyl and crotyl chlorides, alpha- and beta-chloroethylbenzene, alpha-chloroethyl-ortho-chlorobenzene, 3-chloro-1-butene and the like; it will be understood that we may also employ the corresponding bromides or other halides as charging stocks for the present process. The process of this invention offers a convenient method of producing useful cyclo-olefins such as cyclopentene, methylcyclopentenes, cyclohexene, and methylcyclohexenes from the respective cycloalkyl chlorides.

We have observed that secondary and tertiary haloalkanes and halocycloalkanes are far more readily dehydrohalogenated by the catalysts of this invention than primary haloalkanes and halocycloalkanes. Thus, it is possible by proper adjustment of the reaction temperature preferentially to dehydrochlorinate the secondary heptyl chlorides contained in a mixture of primary and secondary heptyl chlorides, such as can be produced by the chlorination of n-heptane; the same phenomenon of selective dehydrochlorination has been observed in the treatment of a mixture of primary and secondary octyl chlorides in the liquid phase with the catalysts of this invention.

Since the reaction is preferably carried out at temperatures between about 100° C. and about 200° C., the process of this invention is especially suitable for the dehydrochlorination of halogen compounds which boil within this range. However, it is possible to dehydrohalogenate halogen compounds which normally boil below about 100° C. by operating under superatmospheric pressures in order to maintain the charging stock in the liquid phase. In the case of halogen compounds boiling above about 200° C., it may be expedient to carry out the dehydrohalogenation reaction below the boiling point of the halogen compound.

In carrying out the process of this invention the charging stock is heated in the liquid phase in contact with the metal carboxylate catalyst, resulting in the generation of hydrogen halide, which is continuously removed from the reaction mixture. Ordinarily the hydrogen halide distills from the reaction mixture as it forms but it may sometimes be desirable to pass inert stripping gases through the reaction mixture in order to facilitate rapid hydrogen halide removal from the reaction mixture, e. g. gases such as nitrogen, $CO_2$, methane and the like. If desired, the olefin produced by the dehydrohalogenation reaction can also be separated by distillation from the reaction mixture at substantially the rate at which it is formed. Where it is desired to dehydrohalogenate normally solid organic halogen compounds by the process of this invention, said halogen compounds may be treated in solution in a suitable solvent. Upon completion of the dehydrohalogenation reaction the catalyst can be recovered by filtration or otherwise and re-employed for further dehydrohalogenation of the original or a different charging stock, optionally together with an additional quantity of fresh catalyst.

Suitable reaction equipment comprises a vessel communicating with a fractionating column. In this vessel the liquid halogen compound and the metal carboxylate are heated under the desired pressure and vapors of unreacted charging stock, olefin, and hydrogen halide pass into the fractionating column whose reflux temperature is adjusted to liquefy the unconverted charging stock, which is recycled to the reaction vessel, while olefin and hydrogen halide vapors are withdrawn at the top of the fractionating column, and passed through a condenser to liquefy the olefin. We have observed that tertiary olefins such as 1-methyl-1-cyclopentene combine very readily with hydrogen halides, for example, hydrogen chloride gas. If it is desired to avert this recombination of hydrogen halide with olefin, it will, of course, be necessary to minimize the contact between these reagents in the absence of the dehydrohalogenation catalyst. Our process is readily adaptable to continuous operation.

The following examples illustrate the manner in which the principles of this invention can be employed, but it is not intended to limit our invention thereto.

*Example 1*

Separate portions of a mixture of methylcyclopentyl chlorides (obtained by the chlorination of methylcyclopentane followed by fractional distillation to remove unreacted hydrocarbon, dichlorides, and other higher boiling materials) were heated under reflux at atmospheric pressure with each of the catalysts designated in the table below. The reaction vessel was surmounted by a fractionating column, and olefin and hydrogen chloride gas were taken off the head of the column as rapidly as possible, provided that the reflux temperature at the head of the column did not exceed approximately 75° C. In each case thirty parts of the mixed methylcyclopentyl chlorides and 2 per cent by weight of catalyst were employed. Smooth reaction ensued. Hydrogen chloride was evolved rapidly soon after heating of the mixture was started in the case of the more active catalysts.

Dehydrochlorination of methylcyclopentyl chlorides

| Run | Catalyst | Per cent conversion of original methylcyclopentyl chlorides into methylcyclopentenes in one hour |
|---|---|---|
| 1 | Lead-manganese acetate [1] | 52 |
| 2 | Manganous acetate | 30 |
| 3 | Manganous chloride | 4 |
| 4 | Manganous sulfate | 2 |
| 5 | Ferrous acetate | 31 |
| 6 | Cobalt acetate | 36 |
| 7 | Cobalt naphthenate | 14 |
| 8 | Nickel acetate | 50 |
| 9 | Nickel benzoate | 24 |
| 10 | Copper benzoate | 12 |
| 11 | Zinc acetate | 26 |
| 12 | Lead acetate | 13 |
| 13 | Lead chloride | 4 |

[1] The lead-manganese acetate catalyst was prepared by fusing one part of lead acetate trihydrate with two parts of manganous acetate tetrahydrate at about 130° C. until the water was substantially removed.

On redistillation, the products obtained in these experiments boiled over the range 65-76° C. at atmospheric pressure. The recorded boiling points of the three isomeric methylcyclopentenes fall within this range. The products are, therefore, mixtures of isomeric methylcyclopentenes.

By continuing the dehydrochlorination process substantially quantitative yields of olefins may be obtained.

It will be observed that inorganic salts yielded poor results in runs 3, 4 and 13. At first blush, upon comparison of the results obtained with inorganic salts and with organic acid salts, the differences might appear to be due to differences in the solubility of the catalyst in the charging stock. Although solubility may be a factor, it cannot alone account for the excellent results obtained with lead-manganese acetate (run 1) or cobalt acetate (run 6) which do not dissolve noticeably in the charging stock. Nickel benzoate (run 9) gave approximately half the conversion rate of nickel acetate (run 8) but this appears to be due to the fact that the nickel content of the benzoate is only slightly more than about half of that of nickel acetate.

Example 2

A mixture of methylcyclopentyl chlorides of essentially the same composition as those employed in Example 1 (560 g., 4.72 mols) and anhydrous nickel acetate (11.2 g.) were placed in the still pot of a 22 x 500 mm. glass helix-packed fractionating column, whose head was connected to a cool receiving vessel, and heat was applied to the pot. The total heating time was 8 hours during which time the cyclic olefin formed in the reaction mixture was distilled as rapidly as possible while maintaining the vapor temperature at the head of the fractionating column between 67 and 71° C. No precautions were taken to prevent contact between hydrogen chloride gas and methylcyclopentenes in the cold products receiving vessel, with the result that the tertiary methylcyclopentene in the mixture of secondary and tertiary methylcyclopentenes in the receiver reacted rapidly with the hydrogen chloride gas to form tertiary methylcyclopentyl chloride (1-chloro-1-methylcyclopentane). Upon redistillation of the liquid reaction products obtained from the cold products receiver, there was obtained 167 grams (45 per cent) of tertiary methylcyclopentyl chloride (B. P. 68° C./125 mm.) and 202 grams (55 per cent) of a mixture of 1- and 2-methylcyclopentenes. The residue in the still pot contains small quantities of unchanged starting material and of methylcyclopentene polymers. Of the mixed methylcyclopentyl chloride starting material, 7 per cent by weight was recovered unchanged; 52 per cent by weight was converted into a mixture of methylcyclopentenes; 30 per cent by weight was recovered as 1-chloro-1-methylcyclopentane; 10 per cent by weight was converted into methylcyclopentene polymers; 1 per cent by weight was not accounted for.

Example 3

A mixture of 30 parts by weight of cyclohexyl chloride and 0.6 part of nickel acetate was heated under reflux at atmospheric pressure in a reaction vessel surmounted by a fractionating column. No evolution of hydrogen chloride was observed until the mixture had been refluxed for about twenty-five minutes. After this induction period hydrogen chloride was evolved rapidly. Heating was continued and the apparatus was adjusted so that cyclohexene was taken off from the head of the column as rapidly as possible while returning unreacted cyclohexyl chloride to the reaction vessel. It was found that 52 per cent of the cyclohexyl chloride was converted into cyclohexene during one hour after the reaction had started. By continuing to heat the mixture of cyclohexyl chloride and catalyst a nearly quantitative yield of cyclohexene was obtained.

In a similar experiment in which the mixture of cyclohexyl chloride and nickel acetate was treated briefly with gaseous hydrogen chloride prior to heating, reaction started immediately on refluxing, and 55 per cent of the cyclohexyl chloride was converted into cyclohexene in one hour.

Example 4

A mixture of 30 parts by weight of 2-chlorooctane (B. P. 171-172° C.) and 0.6 part of nickel acetate was heated at the reflux temperature at atmospheric pressure. Within a few minutes hydrogen chloride was evolved and octene boiling at about 120° C. began to distil over at the head of a short fractionating column surmounting the reaction vessel. Approximately 50 per cent of the 2-chloro-octane was converted into olefin during one hour, and by extending the heating period, a nearly quantitative yield of octene was obtained.

Example 5

Normal heptane was chlorinated in the liquid phase at 70° C. by passing dry chlorine therethrough. A chlorination flask was used in which the chlorine was admitted from the bottom through a fritted glass membrane, the chlorine passing through a column of liquid hydrocarbon 12 to 13 inches long. The entire flask was exposed to normal incandescent room lights. A molar ratio of 4 mols of hydrocarbon to 1 of chlorine was used to prevent the formation of dichlorides. The reaction mixture was fractionated in a Vigreaux column to yield, among other products, a fraction boiling between 152 and 160° C. at atmospheric pressure comprising principally 1-chloro-n-heptane containing a small proportion of secondary heptyl chlorides. This fraction (36.1 g.) was heated to reflux with 2 per cent by weight of anhydrous nickel acetate for about 6 hours. During this time, 3.5 g. of heptenes distilled through the fractionating column surmounting the reaction vessel, indicating that the small amount of secondary heptyl chlorides in the charging stock can be selectively dehydrochlorinated. The boiling point of the residue in the reaction vessel was 155 to 169° C.; the normal boiling point of 1-chloro-n-heptane is 159.5° C.

*Example 6*

A mixture of 20 g. of 1-chloro-octane (B. P. 182–184° C.), 20 g. of 2–chloro-octane (B. P. 171–172° C.), and 0.8 g. of nickel acetate was heated to reflux. Within five minutes HCl gas was evolved and olefin boiling at 120° C. distilled over. The reaction was allowed to proceed until 50 per cent of the starting material had been converted to octene. The weight of octene formed was 14.8 g. The residue in the still-pot was separated from the catalyst with the aid of a centrifuge and then distilled. It boiled at 180–183° C. (90 volume per cent boiled above 182° C.) showing that it consisted almost exclusively of the 1-chloro-octane, and that selective dehydrochlorination of 2-chloro-octane in the presence of 1-chloro-octane was achieved, apparently to the extent of 98 per cent of the theoretical quantity.

*Example 7*

1-chloro-octane (B. P. 182–184° C.) was prepared in about 80 per cent yield by treatment of octanol-1 with thionyl chloride. When a mixture of 30 g. of 1-chloro-octane and 0.6 g. of nickel acetate was refluxed for 1½ hours at atmospheric pressure there was no reaction. The mixture was activated with hydrogen chloride and refluxed for 2 more hours, after which dehydrochlorination began. The reaction was allowed to proceed for one hour during which time 4.8 g. of crude octene distilled overhead boiling at 118–112° C. This amounts to about a 20 per cent conversion to octene in one hour after the start of the reaction.

Although we have described certain specific application of our invention, it will be apparent that it is capable of considerable extension and modification without inventive departure from the spirit thereof.

We claim:

1. A process for the catalytic dehydrohalogenation of an organic halogen compound containing two adjacent aliphatic carbon atoms bound, respectively, to a hydrogen atom and a halogen atom, which process comprises contacting said halogen compound in the liquid phase with a catalytic quantity not in excess of about 10 per cent by weight of a carboxylate of a metal having an atomic number between 25 and 30, inclusive, at a temperature sufficient to generate hydrogen halide from the reaction mixture.

2. The process of claim 1 wherein the metal carboxylate is nickel acetate.

3. The process of claim 1 wherein the metal carboxylate is lead-manganese acetate.

4. The process of claim 1 wherein the metal carboxylate is ferrous acetate.

5. A process for the catalytic dehydrohalogenation of a monohaloalkane which comprises contacting the same in the liquid phase with a catalytic quantity not in excess of about 10 per cent by weight of a carboxylate of a metal having an atomic number between 25 and 30, inclusive, at a temperature sufficient to generate hydrogen halide from the reaction mixture.

6. The process of claim 5 wherein the monohaloalkane is a monochloroalkane.

7. A process for the catalytic dehydrohalogenation of a monohalocycloalkane which comprises contacting the same in the liquid phase with a catalytic quantity not in excess of about 10 per cent by weight of a carboxylate of a metal having an atomic number between 25 and 30, inclusive, at a temperature sufficient to generate hydrogen halide from the reaction mixture.

8. The process of claim 7 wherein the monohalocycloalkane is a monochlorocycloalkane.

9. A process for the catalytic dehydrohalogenation of a monohaloalkane which comprises contacting the same in the liquid phase with between 0.1 and about 10 per cent by weight of a carboxylate of a metal having an atomic number between 25 and 30, inclusive, at a temperature between about 100° C. and about 200° C., and separating hydrogen halide from the reaction mixture.

10. The process of claim 9 wherein the monohaloalkane is a monochloroalkane.

11. The process of claim 9 wherein the metal carboxylate is nickel acetate.

12. The process of claim 9 wherein the metal carboxylate is lead-manganese acetate.

13. The process of claim 9 wherein the metal carboxylate is ferrous acetate.

14. A process for the catalytic dehydrohalogenation of a monohalocycloalkane which comprises contacting the same in the liquid phase with between about 0.1 and about 10 per cent by weight of a carboxylate of a metal having an atomic number between 25 and 30, inclusive, at a temperature between about 100° C. and about 200° C., and separating hydrogen halide from the reaction mixture.

15. The process of claim 14 wherein the monohalocycloalkane is a monochlorocycloalkane.

16. The process of claim 14 wherein the monohalocycloalkane is a methylcyclopentyl chloride.

17. A process for the catalytic dehydrochlorination of a secondary octyl chloride in the presence of a primary octyl chloride, which process comprises contacting a charging stock comprising primary and secondary octyl chlorides in the liquid phase with about 0.1 to about 10 per cent by weight of a carboxylate of a metal having an atomic number between 25 and 30, inclusive, at a temperature between about 100° C. and about 200° C., and removing hydrogen chloride from the reaction mixture.

18. A process for the catalytic dehydrochlorination of a secondary heptyl chloride in the presence of a primary heptyl chloride, which process comprises contacting a charging stock comprising primary and secondary heptyl chlorides in the liquid phase with about 0.1 to about 10 per cent by weight of a carboxylate of a metal having an atomic number between 25 and 30, inclusive, at a temperature between about 100° C. and about 200° C., and removing hydrogen chloride from the reaction mixture.

19. A process for the catalytic dehydrochlorination of a methylcyclopentyl chloride which comprises contacting said methylcyclopentyl chloride in the liquid phase with between about 0.1 and about 10 per cent by weight of nickel acetate at a temperature between about 100° C. and about 200° C., and separating hydrogen chloride from the reaction mixture.

20. A catalytic dehydrochlorination process which comprises refluxing a mixture comprising secondary and tertiary methylcyclopentyl chlorides with between 0.1 and about 10 per cent by weight of a carboxylate of a metal having an atomic number between 25 and 30, inclusive, fractionally distilling hydrogen chloride and methylcyclopentenes from the reaction mixture during the course of reaction, condensing methylcyclopentenes in contact with hydrogen chloride, whereupon tertiary methylcyclopentene reacts with hydrogen chloride to yield tertiary methylcyclopentyl chloride, and fractionally distilling said condensate to separate secondary methylcyclopentenes and tertiary methylcyclopentyl chloride, respectively.

21. The process of claim 20 wherein the metal carboxylate is nickel acetate.

22. A process which comprises refluxing a mixture comprising a non-tertiary alkyl halide with a catalytic quantity not in excess of about 10 per cent by weight of a carboxylate of a metal having an atomic number between 25 and 30, inclusive, fractionally distilling hydrogen halide and a non-tertiary olefin from the reaction mixture during the course of the reaction and fractionally condensing said non-tertiary olefin.

JOHN E. LEONARD.
ARTHUR E. BEARSE.

REFERENCES CITED

The following references are of record in the file of this patent:

UNITED STATES PATENTS

| Number | Name | Date |
|---|---|---|
| 876,137 | Bischler et al. | Jan. 7, 1908 |
| 1,221,382 | Schmidt et al. | Apr. 3, 1917 |
| 1,254,866 | Thiele | Jan. 29, 1918 |
| 2,065,323 | Thomas et al. | Dec. 22, 1936 |

FOREIGN PATENTS

| Number | Country | Date |
|---|---|---|
| 453,992 | France | Apr. 17, 1913 |
| 576,388 | Germany | May 12, 1933 |

OTHER REFERENCES

Ellis: Chem. of Pet. Der., vol. II, pages 804-5 (1937); pub. by Reinhold Pub. Corp., New York.